United States Patent [19]

Schwartz

[11] Patent Number: 5,655,267
[45] Date of Patent: Aug. 12, 1997

[54] WIRE TIGHTENING APPARATUS

[76] Inventor: Donald Schwartz, Box 1693, Vanderhoof, B.C., Canada, V0J 3A0

[21] Appl. No.: 549,914

[22] Filed: Oct. 30, 1995

[51] Int. Cl.⁶ .................................................. A44B 21/00
[52] U.S. Cl. ..................... 24/71.1; 24/68 D; 242/338.4; 254/213
[58] Field of Search ........................... 24/71.1, 68 F, 24/68 D, 68 E, 68 CD, 68 R; 256/40, 41, 43, 44; 242/338.2, 338.4; 254/213, 214, 215

[56] References Cited

U.S. PATENT DOCUMENTS

| | | |
|---|---|---|
| 78,478 | 6/1868 | Seyler . |
| 432,429 | 7/1890 | McClaughry .................. 24/71.1 |
| 550,970 | 12/1895 | Hemenway ..................... 24/71.1 |
| 559,133 | 4/1896 | Holden . |
| 912,960 | 2/1909 | Hestness . |
| 1,473,026 | 12/1923 | Barber . |
| 1,663,182 | 3/1928 | Semmler ...................... 242/388.4 |
| 2,311,792 | 2/1943 | Van Valkenburgh . |
| 3,620,263 | 11/1971 | Beltran . |
| 3,815,180 | 6/1974 | De Haai ..................... 242/388.4 X |
| 4,353,150 | 10/1982 | Docken ........................ 24/71.1 |
| 4,470,501 | 9/1984 | Wilson ....................... 24/71.1 X |
| 5,012,559 | 5/1991 | Flannery . |
| 5,170,536 | 12/1992 | McBroom . |
| 5,383,256 | 1/1995 | Wachi et al. . |

FOREIGN PATENT DOCUMENTS

| | | | |
|---|---|---|---|
| 1044382 | 11/1953 | France ........................ 242/388.4 |
| 511389 | of 1955 | Italy .......................... 24/283 |

*Primary Examiner*—Peter M. Cuomo
*Assistant Examiner*—Hanh V. Tran
*Attorney, Agent, or Firm*—Merchant, Gould, Smith, Edell, Welter & Schmid

[57] ABSTRACT

A tool for tensioning a fence wire winds the fence wire around a wire tightening device that remains in the fence after the tool has been removed. The wire tightening device includes at least 3 wire engaging elements which are attached to a substantially rigid planar base. The device introduces tension by threading the wire around the wire engaging elements which takes up the slack therein. The tool manipulates the device by bringing it in to contact with the wire and rotating it around the wire. The tool then disengages from the device which becomes a permanent part of the fence.

25 Claims, 1 Drawing Sheet

WIRE TIGHTENING APPARATUS

BACKGROUND

The present invention relates to a tool for wire fencing. Specifically, the invention concerns apparatus for tightening a span of wire by taking up the slack in the wire.

A large number of devices are known in the prior art for increasing the tension in a wire, rope or similar article. For example, U.S. Pat. No. 1,476,026 issued Dec. 4, 1923 to Barber, shows a device in which a clothesline is engaged between the legs of a U-shaped cleat that extends sideways from an elongated member. When the elongated member is rotated about an axis parallel to the legs of the U-shaped member and midway between them, the clothesline or cable is wound around the legs thereby taking up the slack in the cable and increasing the tension in the cable. At the other end of the elongated member, Barber's device includes a crook that is set over the cable to prevent the handle from rotating and thereby unwinding the cable.

Comparable devices are also shown in U.S. Pat. No. 5,012,559, issued May 7, 1911 to Flannery and in U.S. Pat. No. 5,383,256, issued Jan. 24, 1995 to Wachi et al. The devices of these patents must remain engaged in the lines so long as the increased tension is to be maintained.

If a person wants to increase the tension in a number of spans of wire, such as in a wire fence enclosing a large pasture, it is necessary with the devices of the prior art to use a number of such devices. This is relatively expensive. In addition, because the handle of the device remains in the fence, it would be easy for vandals to disengage the devices of the prior art and steal them.

Inventions consisting of wire tightening devices and tools for their use are also known in the prior art. U.S. Pat. No. 912,960 issued Feb. 16, 1909 to Hestness discloses a wire stretching member and an operating member for its use. U.S. Pat. No. 5,170,536 issued Dec. 15, 1992 to McBroom discloses a tool for tensioning a wire fence around a barb-like article that remains in the fence once the tool has been removed. There are significant limitations in the use of the class of inventions represented by the above mentioned apparatuses. The Hestness' device engages the wire at two points, a looping element and a single stabilizing element. This structure makes the Hestness' invention unstable and prone to disengage from a fence when left on the wire for a significant period of time. The McBroom device is unable to alter the amount of tension at the engagement point on the fence and necessarily introduces a barb into the wire as a means of tightening the fence.

SUMMARY

The present invention provides a stable wire tightening means that is able to introduce variable tensions in a wire and which will not readily disengage from the wire. These qualities allow the invented wire tightening apparatus to minimize problems in the prior art wire tighteners and tools for their use.

The invented apparatus includes a wire tightening device which is able to increase tension in wire fences and a tool for its use. After the wire has been tightened, the tool is removed, leaving the device engaged in the wire.

According to the invention wire tightening apparatus comprises a wire tightening device which includes a wire looping element, at least two wire stabilizing elements, and a base for securing the wire looping element with the wire stabilizing elements.

The wire stabilizing elements interact with the wire in a manner such that when wire is threaded around the stabilizing elements and the looping element, the tightening device engages a length of the wire.

When the wire needs to be disengaged from the device at least one of the stabilizing elements or the looping element is released from the wire to thereby release the wire from the wire tightening device.

The invention also includes a tool for operating the wire tightening device. After engaging the wire tightening device with the wire, the tool is removed such that the wire tightening device remains on the tightened wire.

In a preferred form of the invention the stabilizing elements and looping element of the wire tightening device are positioned on the base in a substantially triangular arrangement.

The present invention overcomes the problems of the majority of similar wire tightening devices by separating the tightening device from the tool. In this way, when the tension must be increased in a number of spans, a single tool can be used to install a number of tightening devices.

Once installed, the devices cannot easily be removed without the use of the tool. In this way, the cost of tensioning a number of spans is greatly reduced, as are the possibilities of theft and vandalism.

The present invention covers a wire tightening device and a tool for its use, a wire tightening device and a tool individually, and a method for using the wire tightening apparatus.

The structure and use of the present invention is described in detail below in relation to the following drawings, in which a preferred embodiment of the invention is shown by way of explanation. However, the drawings should not be considered to limit the scope of the invention in any way.

DRAWINGS

The present invention, both as to its organization and manner of operation, together with further objects and advantages thereof, may best be understood with reference to the following description, taken in connection with the accompanying drawings in which.

DESCRIPTION

Although the present invention will be described in the context of tensioning a wire fence, the present invention could also be used to increase the tension in a rope, a cable, or a chain.

Figure 1:
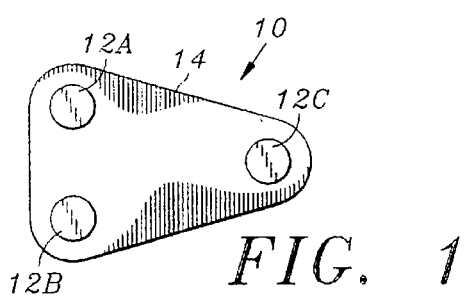
FIG. 1 is a top view showing a wire tightening device of the present invention.

As seen in FIG. 1, a wire tightening device 10 consisting of a planar triangular base 14 that is substantially rigid and which supports three cylindrical wire engaging and stabilizing elements 12A, 12B and 12C. The wire engaging elements 12A, 12B and 12C are grooved studs which are attached perpendicularly to the base 14. The wire engaging elements 12A, 12B and 12C are attached at points proximal to the 3 points of the triangular base 14 and are arranged to form an isosceles triangle.

Figure 2:
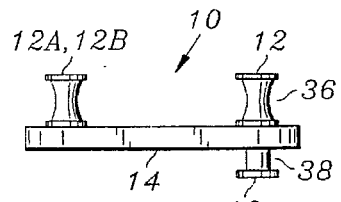
FIG. 2 is a side view of the wire tightening device.

As seen in FIG. 2 the wire engaging elements 12A, 12B and 12C are grooved studs that each have a channel 36 that runs around the circumference of the elements and whose nadir occurs approximately half way between the point of attachment and the unattached end of these elements. The channel 36 serves as a receptacle the wire and prevents it from slipping from the wire engaging elements 12A, 12B and 12C.

Figure 3:
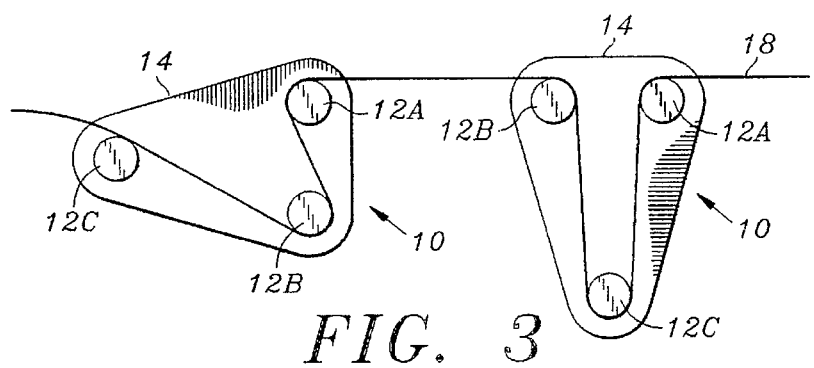
FIG. 3 is a view of a pair of wire tightening devices in engagement with a wire.

As best seen in FIG. 3, in which a fence wire 18 is shown as a solid line, the wire engaging elements 12A, 12B and 12C serve as a series of bobbins around which the wire is wound. The wire 18 may be wound around the wire engaging elements 12A, 12B and 12C in a variety of ways in order to introduce different tensions into the wire 18.

The wire 18 may be wound such that wire engaging elements 12A and 12C serve to stabilize a section of wire that has been looped around wire engaging element 12B. This is illustrated in the left hand depiction of the wire tightening element with the wire. In the right hand depiction of the wire engaging device with the wire, the wire 18 may be wound in an alternative manner such that wire engaging elements 12A and 12B serve to stabilize a section of wire that has been looped around wire engaging element 12C. This latter procedure will effect a greater tension by taking up a greater amount of slack in a section of wire.

As seen in FIG. 2, the wire engaging device 10 has a tool engaging element 16, which is reversibly slidable into a groove 34 in the wire tightening tool 20. The tool engaging element is positioned on the base 14 directly below the wire engaging element 12C, and extends perpendicularly from the base in the opposite direction from element 12C. The tool engaging element 16 is a grooved stud that has a channel 38 which serves as a receptacle for the edges of the ledge 32 in order to secure the wire tightening device 10 to the wire tightening tool 20.

Figure 4:
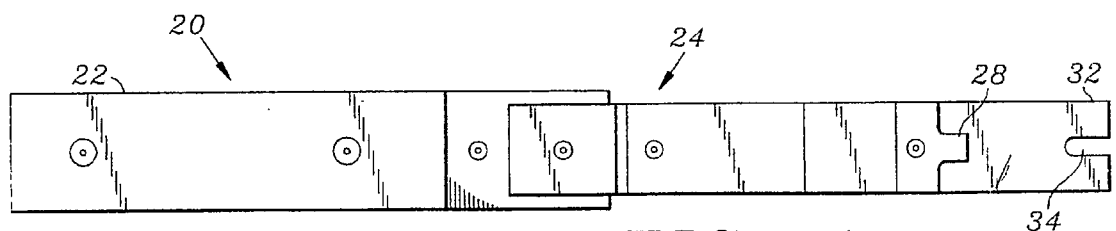
FIG. 4 is a top view of a wire tightening tool of the present invention.

As seen in FIG. 4, the wire tightening tool 20 has a handle 22 and an arm 24. The end of the arm 24 which is opposite to the point of attachment to handle 22 has means for reversibly engaging the wire tightening device 10. The means that the wire tightening tool 20 has for reversibly engaging the wire tightening device 10 includes a prong 28 which engages and secures the wire engaging elements 12A and 12B. In addition, the wire tightening tool 20 includes a ledge 32 to support the base 14 of the wire tightening device 10. The anterior edge of ledge 32 includes a groove 34 for receiving the tool engaging element 16.

Figure 5:
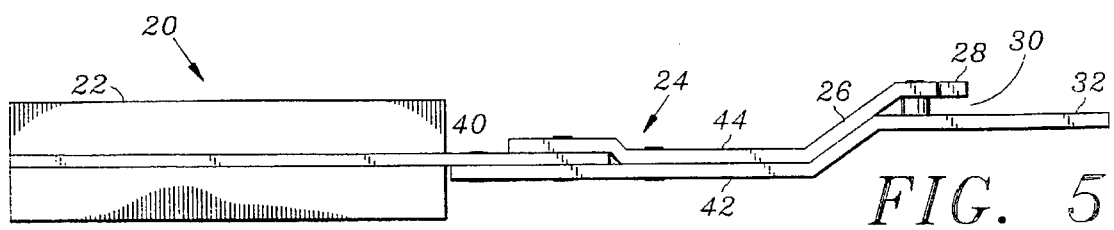
FIG. 5 is a side view of the tool of FIG. 4.

As seen in FIG. 5, the arm 24 of the wire tightening tool 20 consists of 3 bar elements which may be welded or riveted together to form the arm structure of the tool. Bar element 40 is anchored within the handle 22, and serves as support for bar elements 42 and 44. Bar elements 42 and 44 overlap and their anterior ends serve as means for the reversible attachment of the wire tightening device 10. At the distal end of the bar means 42 and 44, the bars are bent to form a crooked handle or shank 26 immediately prior to the device engaging means. The anterior end of bar means 44 forms the prong 28 of the device engaging means. The anterior end of bar means 42 forms the ledge 32 of the device engaging means. A cavity 30, created by a divergence of bar means 42 and bar means 44 at their anterior ends serves as a receptacle for the base 14 of the wire tightening device 10.

The wire tightening device 10 engages the wire tightening tool 20 by sliding into the appropriate tool engaging means at the distal end of the tool. Once the device 10 has been secured on the wire tightening tool 20, the device is ready to engage a section of wire as illustrated in FIG. 3. The device tightens the wire by threading it around the wire engaging elements 12A, 12B and 12C which act as a series of bobbins which loop and secure the wire.

In order to initiate the tightening process and thread the wire around the device as shown in the example illustrated in the right hand side of FIG. 3, the wire 18 is first brought into contact with the inner edge of wire engaging element 12A. The wire is then threaded around the wire engaging elements by rotating the wire tightening tool 20 in a plane substantially parallel to the length of wire in a manner that engages the outer edge of wire engaging element 12C, which in this example serves as the looping element. The tool is then rotated in the same plane so as to engage the inner edge of wire engaging element 12B. Finally, the wire tightening tool 20 is separated from the wire tightening device 10 by sliding the tool in a direction opposite from the apex of the triangular base 14. The wire tightening device 10 remains on the wire due to the interaction between the wire and the wire engaging elements.

There are many permutations of this device and the accompanying wire looping procedures and it will be apparent that various changes may be made thereto without departing from the spirit and scope of the invention.

With the system of the invention the device can be reused as required. Thus when a fence is broken the device can be retrieved, leaving a bent pattern in the wire. After repairing the fence and stretching during the process, the bent pattern in the wire returns to its original shape without fracturing. The wire rests on the posts with an appropriate tension which is sufficient to create tensioning but not breakage.

There has been described a device for use in tensioning a fence wire as well as tool for using the device and a method of use. The foregoing detailed description is illustrative of one embodiment of the invention. It is to be understood that additional embodiments will be clear to those skilled in the art. The embodiments described together with those additional embodiments are considered to be within the scope of the invention.

What is claimed is:

1. Wire tightening apparatus for use with a wire to be tightened, the apparatus comprising:

(a) a wire tightening device including:
        (i) a wire looping element;
        (ii) at least two wire stabilizing elements;
        (iii) a base for securing the wire looping element with the wire stabilizing elements, the wire stabilizing elements being for interacting with a wire to be tightened in a manner such that when wire is threaded around the stabilizing elements and the looping element, the tightening device would engage a length of the wire in a manner whereby the wire would need to be disengaged from at least one of the stabilizing elements or the looping element to thereby release the wire from the wire tightening device;
    (b) a tool for operating the wire tightening device; wherein after engaging the wire tightening device with the wire, the tool is removable from the wire tightening device; and
    (c) means for detachably engaging the tool and the wire tightening device, the means for detachable engagement including a prong for engaging at least one of the wire stabilizing elements.

2. Apparatus as claimed in claim 1, wherein the stabilizing elements and looping element are grooved studs that extend from the base in a substantially perpendicular manner, and whereby the grooves are receptacles for the wire.

3. Apparatus as claimed in claim 1, wherein the wire tightening device includes the wire stabilizing elements extending from the base in one direction, and a tool engaging element extending from the base in an opposite direction.

4. Apparatus as claimed in claim 1, wherein the tool includes a handle and an extended arm, and wherein said means for detachable engagement is distal from the handle.

5. Apparatus as claimed in claim 4, wherein the means for detachable engagement includes a groove for reversible interaction with a tool engaging element, the tool engaging element being reversibly slidable into the groove to permit the tool to grasp and rotate the wire tightening device and to separate from the wire tightening device once said wire tightening device has looped and tightened the wire.

6. Apparatus as claimed in claim 4, wherein the means for detachable engagement includes a cavity for receiving the base of the wire tightening device.

7. Apparatus as claimed in claim 4, wherein the means for detachable engagement includes a ledge for support of the base of the wire tightening device.

8. Apparatus as claimed in claim 4, wherein the tool includes a crooked shank between the handle and the means for detachable engagement.

9. Wire tightening apparatus for use with a wire to be tightened, the apparatus comprising:
 (a) a wire tightening device including:
   (i) a tool engaging element;
   (ii) a wire looping element;
   (iii) at least two wire stabilizing elements;
   (iv) a base for securing the tool engaging element, the wire looping element and the wire stabilizing elements, whereby said wire looping and stabilizing elements serve as a series of bobbins being for receiving a wire to be tightened;
 (b) a tool for operating said wire tightening device; and
 wherein after engaging the wire tightening device with the wire, the tool is disengageable from the wire tightening device, and including a prong for permitting engagement and disengagement respectively between the tool and the device.

10. Apparatus as claimed in claim 9, wherein the stabilizing elements and looping element are grooved studs that extend from the base in a substantially perpendicular manner, and whereby the grooves are receptacles for the wire.

11. Apparatus as claimed in claim 9, wherein the wire stabilizing elements extending from the base in one direction, and said tool engaging element extending from the base in an opposite direction.

12. Wire tightening apparatus for use with a wire to be tightened, the apparatus comprising:
 (a) a wire tightening device including:
   (i) a grooved, cylindrical wire looping element;
   (ii) at least two grooved, cylindrical wire stabilizing elements;
   (iii) a base for the wire looping element and the wire stabilizing elements, whereby said wire looping and stabilizing elements serve as bobbins for receiving a wire to be tightened;
 (b) a tool for operating said wire tightening device; and
 wherein after engaging the wire tightening device with the wire, the tool is disengageable from the wire tightening device and including a prong for permitting engagement and disengagement respectively between the tool and the device.

13. Apparatus as claimed in claim 12, wherein the wire stabilizing elements extending from the base in one direction, and said tool engaging element extending from the base in an opposite direction.

14. A wire tightening device for use with a wire to be tightened, the device comprising:
 (a) a wire looping element;
 (b) at least two wire stabilizing elements; and
 (c) a base for securing the wire looping element with the wire stabilizing elements, the wire stabilizing elements interacting with a wire to be tightened in a manner such that when wire is threaded with the stabilizing elements and the looping element, the device engages the wire in a manner whereby the wire needs to be disengaged from at least one of the stabilizing elements or the looping element to thereby release the wire from the wire tightening device, and wherein the device is engageable and disengageable with a tool, and there being a prong for permitting such engagement and disengagement respectively.

15. The device as claimed in claim 14, wherein the stabilizing elements and looping element of the wire tightening device are positioned on the base in a substantially triangular arrangement.

16. The device as claimed in claim 15, wherein the wire stabilizing elements are proximal to three points of a triangulated planar base, and wherein the base is substantially an isosceles triangle.

17. Apparatus as claimed in claim 14, wherein the stabilizing elements and looping element are grooved studs that extend from the base in a substantially perpendicular manner, and whereby the grooves are receptacles for the wire.

18. The device as claimed in claim 14, wherein the wire stabilizing elements extending from the base in one direction, and said tool engaging element extending from the base in an opposite direction.

19. A wire tightening tool for use with a wire to be tightened, the tool comprising:
 (a) a handle;
 (b) an extended arm;
 (c) means for reversible engagement with a wire tightening device including:
   (i) a groove for interacting with a tool engaging element of the wire tightening device,
   (ii) a ledge for supporting a base of the wire tightening device,
   (iii) a cavity for receiving the base of the wire tightening device;
   (iv) a prong for facilitating engagement with the wire tightening device; and
 wherein the tool cooperates with the wire tightening device for effective tightening of a wire to be tightened.

20. A method for tightening wire comprising:
 (a) engaging a wire tightening device with a tool for detachable engagement with the device;
 (b) tightening a wire with the wire tightening device by sequentially;
   (i) engaging the wire with a first stabilizing element;
   (ii) engaging the wire with a looping element by rotating the tool in a plane substantially parallel to a length of the wire;
   (iii) engaging the wire with a second stabilizing element by further rotating the tool in said plane; and
 (c) disengaging the wire tightening device from the tool by sliding the tool in a direction such that the wire tightening device is separated from the tool such disengagement acting to disengage a prong adjacent to the stabilizing element normally between the tool and device when the tool and device are engaged.

21. Wire tightening apparatus for use with a wire to be tightened, the apparatus comprising:

(a) a wire tightening device including:
  (I) a wire looping element;
  (ii) at least two wire stabilizing elements;
  (iii) a base for securing the wire looping element with the wire stabilizing elements, the wire stabilizing elements being for interacting with a wire to be tightened in a manner such that when wire is threaded around the stabilizing elements and the looping element, the tightening device would engage a length of the wire in a manner whereby the wire would need to be disengaged from at least one of the stabilizing elements or the looping element to thereby release the wire from the wire tightening device;

(b) a tool for rotating the wire tightening device in a plane; wherein the wire tightening device is engageable with the wire, means for permitting the tool to be slidingly removable with the wire tightening device and wherein the sliding direction is substantially in the plane of rotation.

22. A wire tightening device for use with a wire to be tightened, the device comprising:

(a) a wire looping grooved stud element;
(b) at least two wire stabilizing grooved stud elements; and
(c) a base non-removably mounting the wire looping element with the wire stabilizing elements, the wire stabilizing elements interacting with a wire to be tightened in a manner such that when wire is threaded with the stabilizing elements and the looping element, the device engages the wire in a manner whereby the wire needs to be disengaged from at least one of the stabilizing elements or the looping element to thereby release the wire from the wire tightening device, and wherein the stablizing elements and looping element of the wire tightening device are positioned on the base in a substantially triangular arrangement.

23. The device as claimed in claim 22, wherein the wire stabilizing elements are proximal to three points of a triangulated planar base, and wherein the base is substantially an isosceles triangle.

24. Apparatus as claimed in claim 22, wherein the stabilizing elements and looping element that extend from the base in a substantially perpendicular manner, and whereby the grooves are receptacles for the wire.

25. The device as claimed in claim 24, wherein the wire engaging elements extending from the base in one direction, and a tool engaging element stud extends from the base in an opposite direction.

* * * * *